(12) United States Patent
Mitsuya et al.

(10) Patent No.: US 10,943,487 B2
(45) Date of Patent: Mar. 9, 2021

(54) CONTROL APPARATUS, CONTROL SYSTEM, AND CONTROL PROGRAM FOR VEHICLE

(71) Applicant: PANASONIC INTELLECTUAL PROPERTY MANAGEMENT CO., LTD., Osaka (JP)

(72) Inventors: Ikuya Mitsuya, Kanagawa (JP); Takanosuke Adachi, Kanagawa (JP); Hiroki Oobayashi, Kanagawa (JP); Shinya Ema, Kanagawa (JP); Takao Nihei, Kanagawa (JP); Nobutoshi Higaki, Kyoto (JP); Yuki Nishimura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/701,422

(22) Filed: Dec. 3, 2019

(65) Prior Publication Data

US 2020/0180502 A1 Jun. 11, 2020

(30) Foreign Application Priority Data

Dec. 5, 2018 (JP) .............................. JP2018-228256
Jan. 28, 2019 (JP) .............................. JP2019-012257

(51) Int. Cl.
*G08G 1/16* (2006.01)
*B60Q 9/00* (2006.01)
(Continued)

(52) U.S. Cl.
CPC ............. *G08G 1/166* (2013.01); *B60Q 9/008* (2013.01); *G08G 1/16* (2013.01); *B60K 35/00* (2013.01);
(Continued)

(58) Field of Classification Search
CPC . B60Q 1/14; B60Q 1/143; B60Q 1/52; B60Q 1/525; B60Q 1/54; B60Q 9/00;
(Continued)

(56) References Cited

U.S. PATENT DOCUMENTS 7,592,928 B2 * 9/2009 Chinomi ................... B60R 1/00 340/436
10,183,614 B1 * 1/2019 Biswal .................. G06K 9/2036
(Continued)

FOREIGN PATENT DOCUMENTS

JP 2013-043641 3/2013

*Primary Examiner* — Van T Trieu
(74) *Attorney, Agent, or Firm* — Greenblum & Bernstein, P.L.C.

(57) ABSTRACT

Control apparatus that controls headlamp of a vehicle and HUD of the vehicle includes acquirer that obtains information about an object situated ahead of the vehicle from monitoring apparatus monitoring an area ahead of the vehicle, light emission controller that controls the light emission form of headlamp based on a position at which the object is present, and display controller that causes HUD to display an alert image indicating the position of the object such that the alert image is superimposed on or situated adjacent to the actual position of the object in a view that is observed in a forward direction with respect to the vehicle.

17 Claims, 16 Drawing Sheets

(51) Int. Cl.
  *B60Q 1/14* (2006.01)
  *G06K 9/00* (2006.01)
  *G02B 27/01* (2006.01)
  *B60K 35/00* (2006.01)

(52) U.S. Cl.
  CPC .................. *B60K 2370/1529* (2019.05); *B60K 2370/178* (2019.05); *B60K 2370/52* (2019.05); *B60Q 1/143* (2013.01); *B60Q 2300/054* (2013.01); *B60Q 2300/112* (2013.01); *B60Q 2300/42* (2013.01); *B60Q 2300/45* (2013.01); *G02B 27/0101* (2013.01); *G02B 2027/0141* (2013.01); *G06K 9/00369* (2013.01); *G06K 9/00805* (2013.01)

(58) Field of Classification Search
  CPC ............ B60Q 2300/00; B60Q 2300/05; B60Q 2300/054; B60Q 2300/056; B60Q 2300/11; B60Q 2300/112; B60Q 2300/114; B60Q 2300/40; B60Q 2300/41; B60Q 2300/42; B60Q 2300/45; B60Q 2300/47; G08G 1/16; G08G 1/162; G08G 1/164; G08G 1/166; G08G 1/167; G08G 1/161
  See application file for complete search history.

(56) References Cited

U.S. PATENT DOCUMENTS

| | | | |
|---|---|---|---|
| 2008/0175012 A1* | 7/2008 | Shimaoka | B60Q 1/085 362/464 |
| 2013/0051042 A1 | 2/2013 | Nordbruch | |
| 2016/0368413 A1* | 12/2016 | Nishii | F21S 41/36 |

* cited by examiner

| DETECTION STATE OF DANGER SIGNAL | HEADLAMP CONTROL | HUD CONTROL | LIGHTING APPARATUS CONTROL | SPEAKER CONTROL |
|---|---|---|---|---|
| CHANGE FROM DANGER LEVEL 0 TO DANGER LEVEL 1 (NEED FOR HEADLAMP ILLUMINATION) | ⇧ CONTROL LIGHT EMISSION | EMPHASIZED DISPLAY | CHANGE LIGHTING FORM (COLOR OR THE LIKE) | OUTPUT ALARM SOUND |
| CHANGE FROM DANGER LEVEL 0 TO DANGER LEVEL 1 (NO NEED FOR HEADLAMP ILLUMINATION) | ⇧ NORMAL LIGHT EMISSION | EMPHASIZED DISPLAY | NORMAL LIGHTING | OUTPUT ALARM SOUND |
| CHANGE FROM DANGER LEVEL 1 TO DANGER LEVEL 2 | ⇧ CONTROL LIGHT EMISSION | MAINTAIN EMPHASIZED DISPLAY | CHANGE LIGHTING FORM SUCH AS COLOR DEPENDING ON LEVEL OF DANGER | OUTPUT ALARM SOUND |
| CHANGE FROM DANGER LEVEL 1 TO DANGER LEVEL 0 | ⇧ NORMAL LIGHT EMISSION | MAINTAIN EMPHASIZED DISPLAY | NORMAL LIGHTING FORM (CANCEL CHANGE OF LIGHTING FORM SUCH AS COLOR) | NO OUTPUT |
| NO CHANGE IN DANGER LEVEL | ⇧ MAINTAIN LIGHT EMISSION FORM IN PREVIOUS STATE | MAINTAIN DISPLAY FORM IN PREVIOUS STATE | MAINTAIN LIGHTING FORM IN PREVIOUS STATE | NO OUTPUT |

FIG. 14

CONTROL APPARATUS, CONTROL SYSTEM, AND CONTROL PROGRAM FOR VEHICLE

TECHNICAL FIELD

The present disclosure relates to a control apparatus, a control system, and a control program that are used for a vehicle.

BACKGROUND ART

A vehicle control apparatus (also referred to as an intelligent headlamp system) for automatically controlling light emission of a headlamp based on the surrounding environment is known.

For example, Patent Literature 1 describes an example of such a control apparatus that controls light emission of a headlamp to illuminate a position indicated by a danger warning signal when the danger warning signal received by a receiving apparatus indicates that an object representing a danger is present on a travel route of a vehicle.

CITATION LIST

Patent Literature

PTL1
Japanese Patent Application Laid-Open No. 2013-043641

SUMMARY OF INVENTION

Technical Problem

The control apparatuses according to the related art including the technology disclosed in Patent Literature 1 enable a person, for example, a driver to promptly recognize a danger, and as a result, traffic accidents may be prevented. However, in fact, it cannot be said that only controlling light emission of a headlamp is adequate for causing a driver to realize a precarious object situated in an area around a vehicle (an object to which a driver needs to pay attention such as an oncoming vehicle, a pedestrian walking along a travel lane, or a dropped object situated on a travel lane; the same shall apply hereinafter) and there is still room for improvement.

For example, in the control apparatuses according to the related art including the technology disclosed in Patent Literature 1, when an object ahead of a vehicle is an oncoming vehicle, the light of a headlamp is switched from a high beam to a low beam for the purpose of not causing the light of the headlamp to illuminate the oncoming vehicle and not obstructing the view of the driver of the oncoming vehicle. As a result, it may be difficult for the driver to notice the oncoming vehicle.

The present disclosure has been made in view of these problems and an object of the present disclosure is to provide a control apparatus, a control system, and a control program for a vehicle that enable a driver to realize a precarious object.

Solution to Problem

A main aspect of the present disclosure which solves the problems mentioned above is a control apparatus that controls a headlamp of a vehicle and a head-up display of the vehicle, including:

an acquirer that obtains information about an object situated ahead of the vehicle;
a light emission controller that controls a light emission form of the headlamp based on a position of the object; and
a display controller that causes the head-up display to display an alert image indicating the position of the object such that the alert image is superimposed on or situated adjacent to an actual position of the object in a view that is observed in a forward direction with respect to the vehicle.

Further, another aspect is a control system, including:
a headlamp of a vehicle;
a head-up display of the vehicle; and
a control apparatus that controls the headlamp and the head-up display, in which
the control apparatus includes
an acquirer that obtains information about an object situated ahead of the vehicle from a monitoring apparatus that monitors an area ahead of the vehicle,
a light emission controller that controls a light emission form of the headlamp based on a position at which the object is present, and
a display controller that causes the head-up display to display an alert image indicating the position of the object such that the alert image is superimposed on or situated adjacent to an actual present position of the object in a view that is observed in a forward direction with respect to the vehicle.

Further, another aspect is a control program that controls a headlamp of a vehicle and a head-up display of the vehicle, the control program including:

obtaining information about an object situated ahead of the vehicle;
controlling a light emission form of the headlamp based on a position of the object; and
causing the head-up display to display an alert image indicating the position of the object such that the alert image is superimposed on or situated adjacent to an actual position of the object in a view that is observed in a forward direction with respect to the vehicle.

Advantageous Effects of Invention

The control apparatus for a vehicle according to the present disclosure enables a driver to realize a precarious object.

BRIEF DESCRIPTION OF DRAWINGS

FIG. 14 is a control table illustrating details of control performed by the control apparatus according to Embodiment 4;

DESCRIPTION OF EMBODIMENTS

Figure 1:
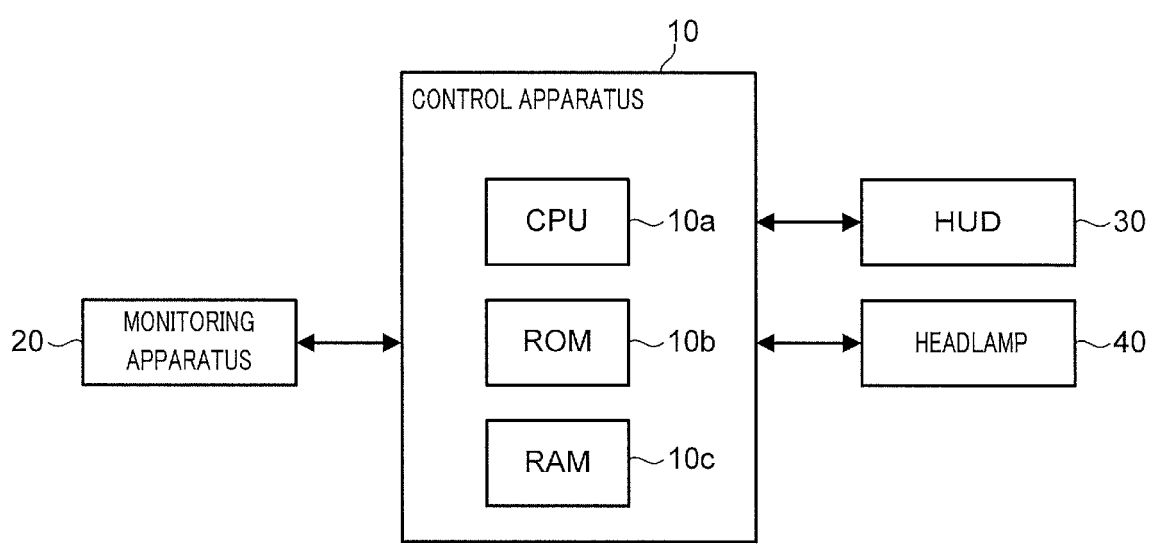
FIG. 1 illustrates a configuration of a control system according to Embodiment 1.

Hereinafter, an embodiment of the present disclosure is described in detail with reference to the accompanying drawings. It should be noted that, in this specification and the accompanying drawings, constituent elements having substantially the same functions are denoted by the same reference characters and redundant descriptions thereof are omitted.

Embodiment 1

[Configuration of Control System]

Hereinafter, an example of a configuration of a control system according to Embodiment 1 is described with reference to FIG. 1.

The control system according to this embodiment is installed in a vehicle, such as an automobile, and assists a driver of the vehicle in driving by using a display image displayed on a head-up display (HUD) (hereinafter referred to as a HUD) and controlling light emission of a headlamp. In the following description, "vehicle" and "host vehicle" denote a vehicle in which the control system is installed, while "another vehicle" and "oncoming vehicle" denote a vehicle other than the vehicle in which the control system is installed.

FIG. 1 illustrates a configuration of control system 1 according to this embodiment.

Control system 1 includes control apparatus 10, monitoring apparatus 20, HUD 30, and headlamp 40.

Monitoring apparatus 20 monitors the area ahead of a vehicle and detect a precarious object ahead of the vehicle. Monitoring apparatus 20 also transmits to control apparatus 10 information about the precarious object containing, for example, information of the position at which the detected precarious object is present (that is, a positional relationship between the precarious object and the vehicle) and information of the type of the precarious object (for example, oncoming vehicle, pedestrian, dropped object, or the like).

Monitoring apparatus 20 is mounted at, for example, the front (for example, a front grille) of the body of the vehicle and includes an on-board camera configured to capture an image of the road ahead of the vehicle. Monitoring apparatus 20 performs image recognition processing on, for example, data of an image captured by the on-board camera, so that monitoring apparatus 20 detects a precarious object ahead of the vehicle. As the technique of image recognition processing, a known pattern recognition processing technique such as template matching or a technique using trained neural networks is employed.

When detecting a precarious object, monitoring apparatus 20 obtains information of the position and the size of the detected precarious object with respect to the image ahead of the vehicle. Monitoring apparatus 20 accordingly recognizes the positional relationship (for example, the distance and the orientation relative to the position of the vehicle) between the vehicle and the precarious object. The distance between the vehicle and a precarious object is recognized by, for example, comparing the detected precarious object with a reference image that is used in template matching or the like. Monitoring apparatus 20 also recognizes the type of the precarious object by using a reference image that is used in template matching or the like.

It is desired that monitoring apparatus 20 includes, instead of or in addition to the on-board camera, a receiving apparatus configured to receive information about the precarious object from outside of the vehicle. The receiving apparatus detects a precarious object ahead of the vehicle by receiving, for example, a beacon signal representing information about the precarious object situated on a road from a beacon placed on the road or information about the precarious object that is transmitted from another vehicle through vehicle-to-vehicle communications. By using the receiving apparatus, monitoring apparatus 20 can detect a precarious object situated in a blind spot of the vehicle (for example, a pedestrian who is present behind a building along a travel lane) (refer to Embodiment 2 described later). The method for detecting a precarious object by using a beacon signal transmitted from a beacon or vehicle-to-vehicle communications is the same as known technologies (refer to, for example, Patent Literature 1).

As monitoring apparatus 20, for example, a millimeter wave radar or a light detection and ranging (LIDAR) device may also be used.

HUD 30 projects on a windshield of the vehicle an image (for example, an image relating to the speed of the vehicle, the travel distance, and traffic signs), such that the image is virtually displayed in a visible manner for a driver. HUD 30 includes, for example, a projector that projects on a windshield a display light corresponding to an image to be displayed and a reflecting mirror that reflects the display light emitted by the projector toward the windshield.

HUD 30 generates an image to be displayed on a windshield and projects the image on the windshield based on a control signal transmitted from control apparatus 10. HUD 30 displays the image such that the image is superimposed on a real view ahead of the vehicle. In this manner, a driver can view the image.

The configuration of HUD 30 is the same as a known configuration and the detailed description about the configuration is thus omitted. As a member on which an image is projected in HUD 30, a combiner provided separately from the vehicle may be used instead of a windshield.

Headlamp 40 emits light ahead of the vehicle. Headlamp 40 includes a left lamp positioned on the left side of the front of the vehicle body and a right lamp positioned on the right side of the front of the vehicle body. The left lamp and the right lamp each include a plurality of light sources (for example, a light source that emits a low beam light and another light source that emits a high beam light) and an adjustment section that adjusts illumination ranges, illumination directions, and illumination intensities of light from the light sources. In Headlamp 40, light emission forms can be controlled individually with respect to each of the left lamp, the right lamp, and the plurality of light sources included in the left lamp and the right lamp.

Headlamp 40 changes the light emission forms based on a control signal transmitted from control apparatus 10. The configuration of headlamp 40 is the same as a known configuration and the detailed description of the configuration is thus omitted.

Control apparatus 10 controls an image displayed on HUD 30 and the light emission form of headlamp 40; the details will be described later.

Control apparatus 10 includes, for example, central processing unit (CPU) 10a that functions as a processing/control unit, read only memory (ROM) 10b that functions as a primary storage apparatus, and random access memory (RAM) 10c. ROM 10b stores, for example, a basic program referred to as the basic input output system (BIOS) and basic configuration data. CPU 10a controls various operations of control system 1 by running, for example, a program that corresponds to a specific processing content, is read from ROM 10b, and is loaded into RAM 10c.

[Details of Configuration of Control Apparatus]

Next, details of a configuration of control apparatus 10 are described with reference to FIGS. 2, 3A, and 3B.

Figure 2:
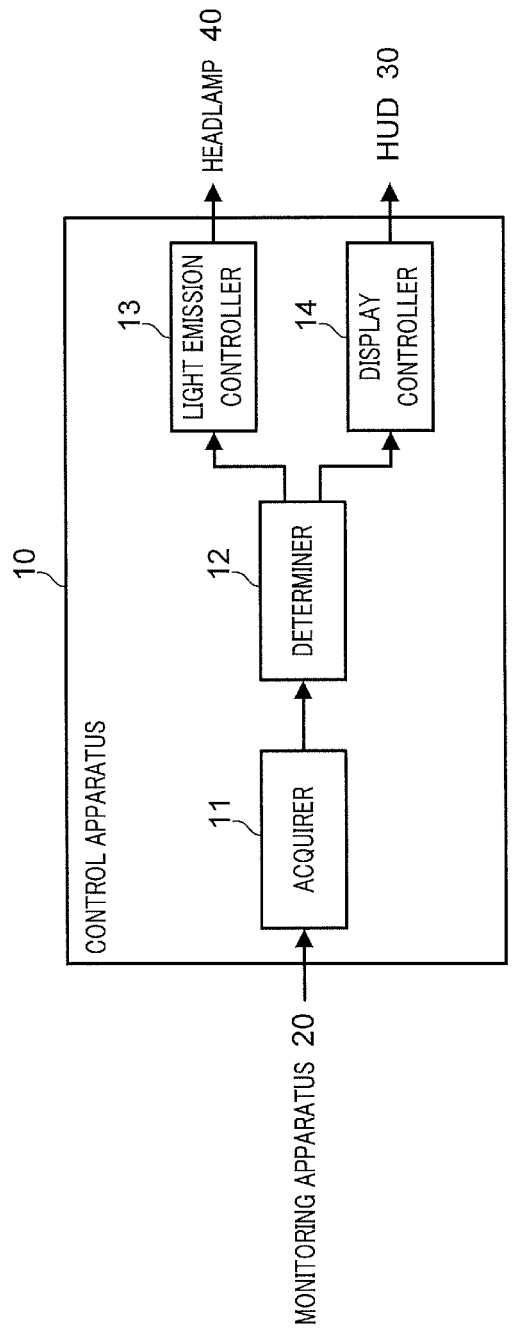
FIG. 2 is a block diagram illustrating a configuration of a control apparatus according to Embodiment 1.

FIG. 2 is a block diagram illustrating a configuration of control apparatus 10 according to this embodiment.

Figure 3A:
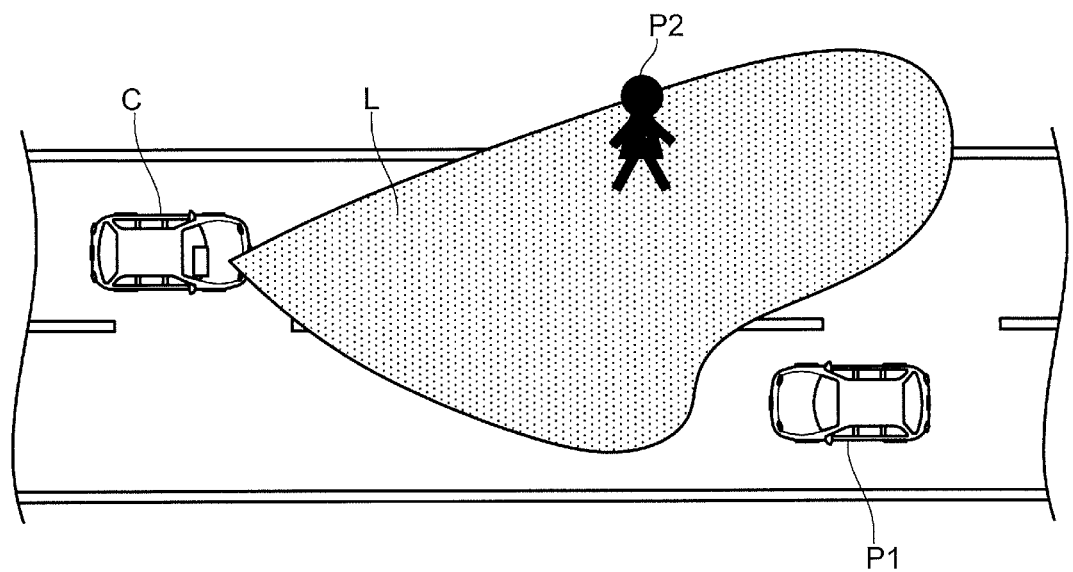
FIG. 3A illustrates an example of a light emission form of a headlamp in the control system according to Embodiment 1.

FIG. 3A is an illustration in the case of viewing travel lanes from a higher viewpoint above a vehicle and illustrates an example of the light emission form of headlamp 40. FIG. 3B is an illustration in the case of viewing ahead of the vehicle from a driver's seat through a windshield under the condition illustrated in FIG. 3A and illustrates an example of a display form of alert images in HUD 30.

Figure 3B:
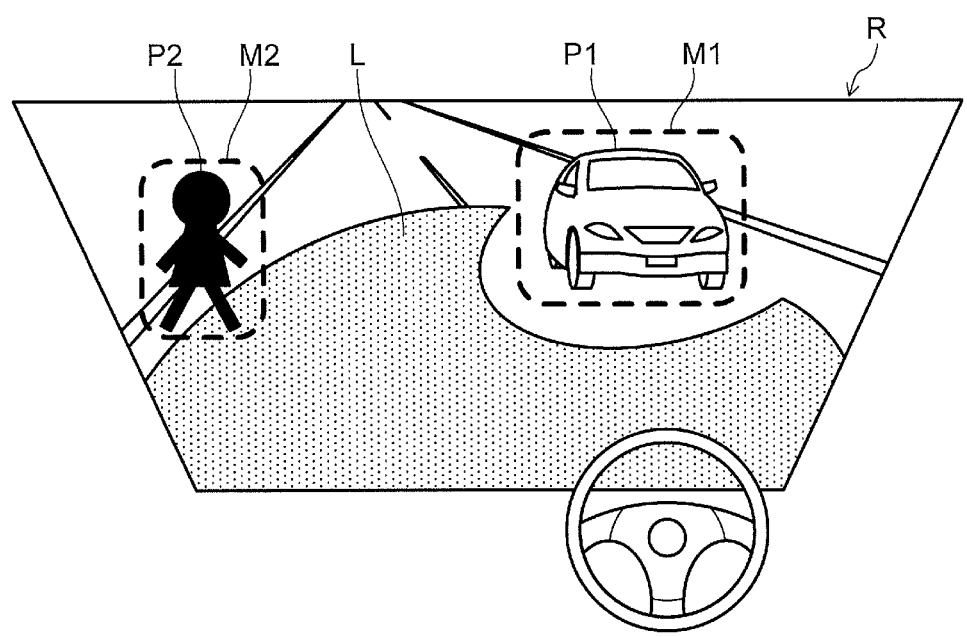
FIG. 3B illustrates an example of a display form of alert images on a head-up display (HUD) in the control system according to Embodiment 1.

In FIGS. 3A and 3B, C indicates a host vehicle, P1 indicates an oncoming vehicle, P2 indicates a pedestrian, and L indicates an illumination range that headlamp 40 can illuminate. Additionally, in FIG. 3B, R indicates a windshield, M1 indicates an alert image that is displayed in HUD 30 and represents the presence of oncoming vehicle P1, and M2 indicates an alert image that is displayed in HUD 30 and represents the presence of pedestrian P2.

Control apparatus 10 includes acquirer 11, determiner 12, light emission controller 13, and display controller 14.

Acquirer 11 obtains, from monitoring apparatus 20 monitoring an area ahead of the vehicle, information (hereinafter also referred to as a "monitor signal") about a precarious object ahead of the vehicle.

Acquirer 11 obtains from monitoring apparatus 20, for example, the type of a precarious object (for example, oncoming vehicle, pedestrian, or dropped object) and information about a position at which the precarious object is present (for example, the distance between the vehicle and the precarious object and the orientation of the precarious object when viewed from the vehicle). The monitor signal contains, for example, information about individual precarious objects ahead of the vehicle.

While the vehicle drives, monitoring apparatus 20 continuously monitors an area ahead of the vehicle to detect a precarious object ahead of the vehicle. Acquirer 11 successively obtains monitor signals from monitoring apparatus 20.

Determiner 12 obtains a monitor signal from acquirer 11 and determines whether a precarious object included in the monitor signal is a target for light emission control by light emission controller 13 and whether the precarious object is a target for display control by display controller 14.

Determiner 12 determines, for example, whether the position of a precarious object is at less than a given distance (for example, less than 300 m) ahead of the vehicle and whether the precarious object is present on a travel lane of the vehicle; and according to the determination results, determiner 12 determines whether the precarious object is a target for light emission control by light emission controller 13 and whether the precarious object is a target for display control by display controller 14. Among precarious objects about which information is contained in a monitor signal, when a particular precarious object is excluded from control targets by determiner 12, information about the particular precarious object is not transmitted to light emission controller 13 and display controller 14 in subsequent stages.

Light emission controller 13 obtains from determiner 12 a monitor signal containing information about a precarious object targeted for control and controls the light emission form of headlamp 40 based on the monitor signal. Light emission controller 13 controls headlamp 40 based on the position at which the precarious object is present; in most cases, when the precarious object is situated on the travel route of the vehicle, light emission controller 13 controls headlamp 40 to emit light to the precarious object.

At this time, it is desired that light emission controller 13 changes the light emission form with regard to the precarious object based on the type of the precarious object. For example, when the precarious object is an oncoming vehicle, it is desired that light emission controller 13 controls headlamp 40 to change the light emission form from a high beam light to a low beam light for the purpose of not illuminating the oncoming vehicle. As another example, when the precarious object is a pedestrian, it is desired that light emission controller 13 controls headlamp 40 to illuminate the pedestrian and the surrounding area around the pedestrian.

FIGS. 3A and 3B illustrate examples of a form in which light emission controller 13 controls headlamp 40 to cause light L to illuminate pedestrian P2 situated on the travel lane, and at the same time, not to illuminate oncoming vehicle P1.

When determining the light emission form of headlamp 40, light emission controller 13 may additionally refer to information about driving condition of the vehicle (for example, the speed of the vehicle or the steering angle of steering) and information about the environment around the vehicle except for the precarious object (the amount of light in the area around the vehicle or traffic condition of the travel lane).

Display controller 14 receives from determiner 12 a monitor signal containing information about a precarious object targeted for control and displays on HUD 30 an alert image indicating the position of the precarious object based on the monitor signal.

At this time, display controller 14 controls HUD 30, for example, such that, when a view ahead of the vehicle is observed from the driver's seat of the vehicle through the windshield, the alert image is superimposed on the precarious object in a real view (specifically, an actual position at which the precarious object is present) or positioned adjacent to the precarious object in the real view; in other words, from the viewpoint of a driver of the vehicle, the alert image is displayed close to a position at which the precarious object in the real view is viewed on the windshield. This configuration enables a driver to easily realize a precarious object situated in an area not illuminated by the light of headlamp 40. It is desired that the position at which a precarious object is present and the position at which a corresponding alert image is displayed on HUD 30 are previously associated with each other.

FIG. 3B illustrates a display form in which display controller 14 displays alert images M1 and M2 on HUD 30 such that alert images M1 and M2 are superimposed respectively on oncoming vehicle P1 and pedestrian P2 in the real view when viewed from the driver's seat of the vehicle. In the drawing, alert images M1 and M2 are indicated by dotted lines enclosing respectively oncoming vehicle P1 and pedestrian P2.

The alert image may be presented on HUD 30 by using a color, a character, or any other appearances. It is desired that the alert image is presented by using a color, a character, or other appearances in a manner in which the type of a corresponding precarious object can be specified. This configuration enables a driver to recognize the type of a precarious object based on an alert image.

It is desired that the timing at which display controller 14 causes HUD 30 to start displaying an alert image to correspond to a precarious object is set at a time earlier than the timing at which light emission controller 13 starts changing the light emission form of headlamp 40 to correspond to the precarious object; in other words, it is desired that the position of a precarious object when display controller 14 starts displaying an alert image to correspond to the precarious object is farther than the position of the precarious object when light emission controller 13 starts changing the light emission form of headlamp 40 to correspond to the precarious object. This configuration enables a driver of a vehicle to realize the presence of a precarious object at a stage before the vehicle approaches close to the precarious object.

[Operational Flow of Control Apparatus]

An example of an operation of control apparatus 10 according to this embodiment is described below with reference to FIG. 4.

Figure 4:
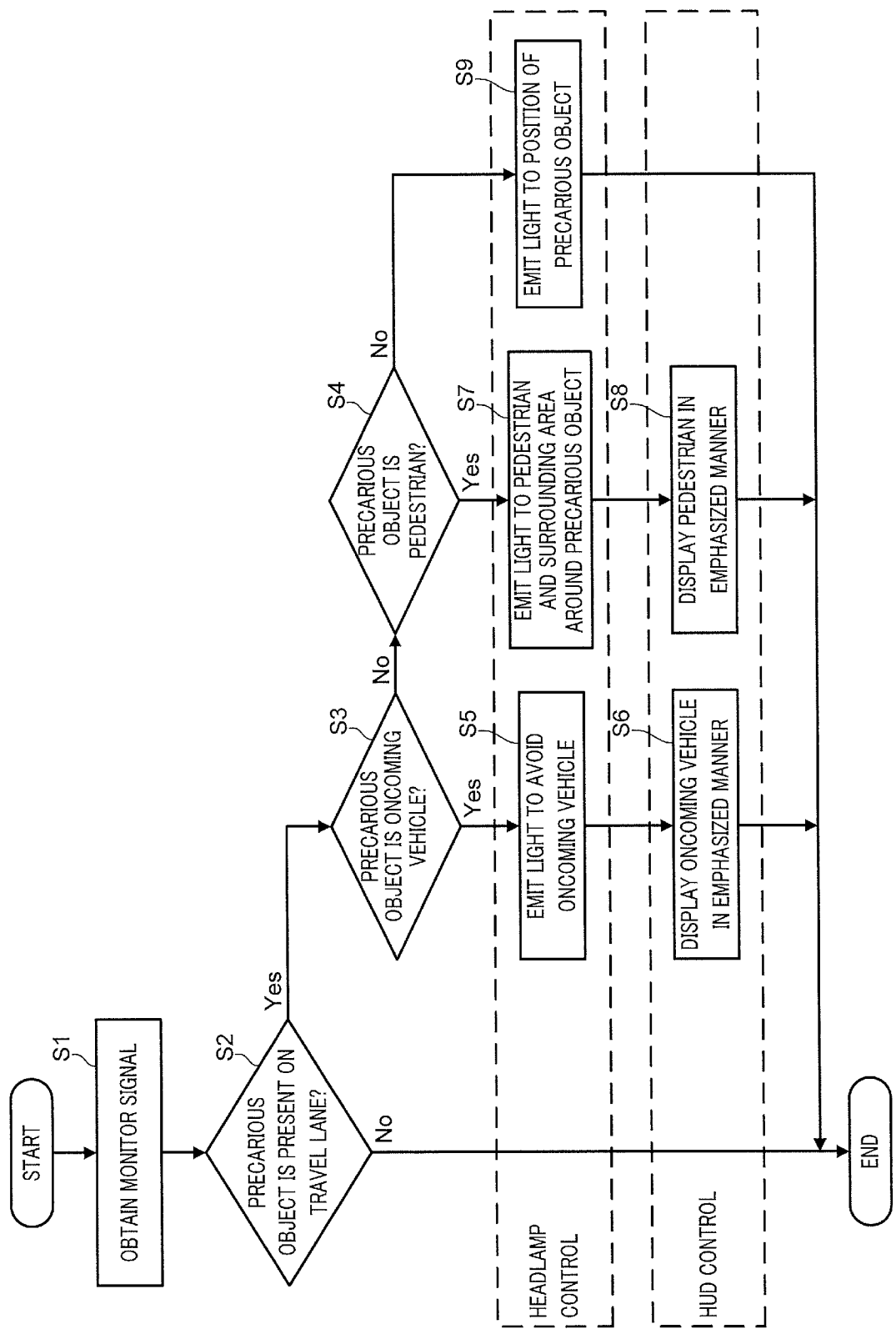
FIG. 4 is a flowchart illustrating an operation of the control apparatus according to Embodiment 1.

FIG. 4 is a flowchart illustrating an operation of control apparatus 10 according to this embodiment. The process illustrated as the flowchart in FIG. 4 is performed by, for example, control apparatus 10 based on a computer program repeatedly at predetermined intervals (for example, 0.1-second intervals).

Firstly, control apparatus 10 obtains a monitor signal from monitoring apparatus 20 (step S1) and determines whether a precarious object is present on a travel lane (step S2). When no precarious object is present on the travel lane (No in step S2), control apparatus 10 ends the process of the flowchart illustrated in FIG. 4. In contrast, when a precarious object is present on the travel lane (Yes in step S2), control apparatus 10 determines the precarious object as a target for control performed by using headlamp 40 or HUD 30 and the process proceeds to step S3.

Subsequently, control apparatus 10 determines whether the precarious object determined as a target for control in step S2 is an oncoming vehicle (step S3). When the precarious object is an oncoming vehicle (Yes in step S3), control apparatus 10 controls headlamp 40 to emit light so as to avoid the precarious object (an oncoming vehicle in this example) (step S5), and additionally, control apparatus 10 controls HUD 30 to display an alert image indicating a position at which the precarious object (an oncoming vehicle in this example) is present (step S6).

When the precarious object determined as a target for control in step S2 is not an oncoming vehicle (No in step S3), control apparatus 10 determines whether the precarious object is a pedestrian (step S4). When the precarious object is a pedestrian (Yes in step S4), control apparatus 10 controls headlamp 40 to emit light to a precarious object (a pedestrian in this example) and a surrounding area around the precarious object (step S7) and also controls HUD 30 to display an alert image indicating a position at which the precarious object (a pedestrian in this example) is present (step S8).

The precarious object determined as a target for control in step S2 is not a pedestrian (No in step S4), control apparatus 10 determines the precarious object as a dropped object and controls headlamp 40 to illuminate the precarious object (a dropped object in this example) (step S9). As regard a dropped object, only illumination with light is sufficient to warn a driver and control apparatus 10 thus does not display any alert image about a dropped object. Alternatively, control apparatus 10 may display an alert image about a dropped object in a manner similar to the processing for a pedestrian and an oncoming vehicle.

By repeatedly performing the processing operations in steps S1 to S9 described above, control apparatus 10 controls, in accordance with a travel position of the vehicle, the light emission form of headlamp 40 depending on a precarious object and HUD 30 to display an alert image depending on a precarious object. With this configuration, when a driver of a vehicle views ahead of the vehicle, whenever a precarious object is present, the driver can view the precarious object in a real view indicated by illumination with light and in some cases together with an alert image for the precarious object.

Advantageous Effects

As described above, control apparatus 10 according to this embodiment includes light emission controller 13 that controls the light emission form of headlamp 40 based on the position at which an object is present and display controller 14 that displays on HUD 30 an alert image indicating the position of the object such that the alert image is superimposed on or situated adjacent to an actual position of the object in a view that is observed in a forward direction with respect to a vehicle.

With the configuration described above, control apparatus 10 according to this embodiment can control headlamp 40 and HUD 30 in conjunction with each other. As a result, for example, when it is difficult for a driver to view a precarious object (for example, an oncoming vehicle or a pedestrian who is present in a blind spot) due to the light emission form of headlamp 40, the driver can be warned of the presence of the precarious object by using HUD 30. This configuration enables a driver to promptly and precisely realize a precarious object.

Embodiment 2

Next, a configuration of control apparatus 10 according to Embodiment 2 is described with reference to FIGS. 5A, 5B, and 6.

Control apparatus 10 according to this embodiment differs from that of Embodiment 1 in a configuration in which control apparatus 10 according to this embodiment detects a precarious object (for example, a pedestrian) situated in a blind spot formed by an obstacle ahead of the vehicle, and when dealing with the precarious object situated in the blind spot, performs processing different from the processing for dealing with a precarious object situated in an area viewable by a driver. It should be noted that the description about configurations identical to those of Embodiment 1 is omitted.

Figure 5A:
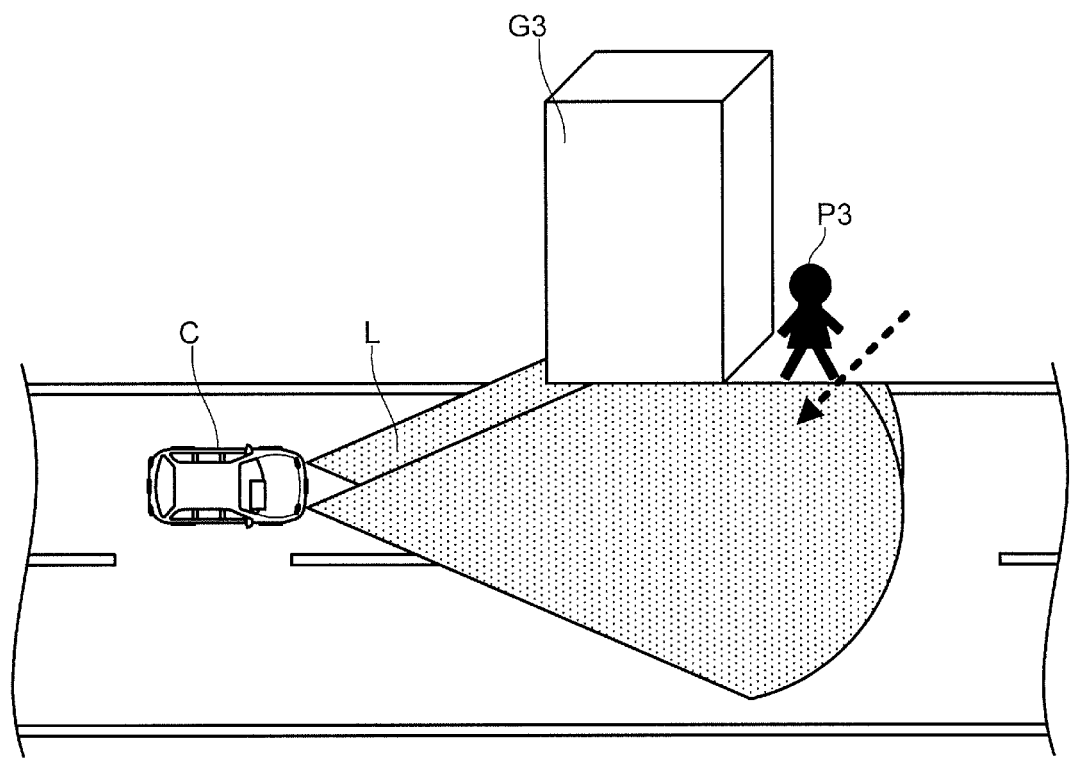
FIG. 5A illustrates an example of a light emission form of a headlamp in a control system according to Embodiment 2.

FIG. 5A is an illustration in the case of viewing travel lanes from a higher viewpoint above a vehicle and illustrates an example of a light emission form of headlamp 40. FIG. 5B is an illustration in the case in which a driver views ahead of the vehicle through a windshield under the condition illustrated in FIG. 5A and illustrates an example of a display form of an alert image in HUD 30.

Figure 5B:
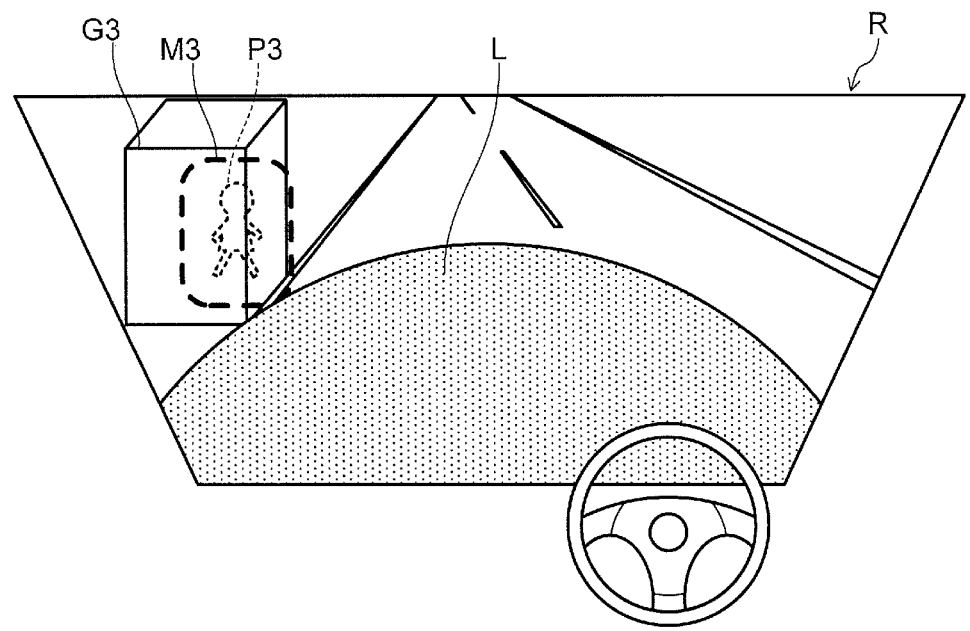
FIG. 5B illustrates an example of a display form of an alert image on a HUD in the control system according to Embodiment 2.

In FIGS. 5A and 5B, C indicates a host vehicle, P3 indicates a pedestrian, G3 indicates an obstacle (for example, a building) forming a blind spot of pedestrian P3, and L indicates an illumination range of light of headlamp 40. In FIG. 5B, R indicates a windshield and M3 indicates an alert image representing the presence of pedestrian P3.

Monitoring apparatus 20 according to this embodiment is configured to be capable of locating the position of a precarious object in a blind spot formed by an obstacle ahead of a vehicle and the position of the obstacle forming the blind spot. As monitoring apparatus 20, for example, a receiving apparatus configured to receive, as a beacon signal transmitted from a beacon installed on a road, information about a precarious object situated on the road is used. The beacon detects a precarious object situated on a road, and a building, the surface of a mountain, and the like that are present along a travel lane based on, for example, an image captured by a camera installed on the road. Alternatively, for example, a receiving apparatus configured to perform vehicle-to-vehicle communications may be used as monitoring apparatus 20.

Acquirer 11 obtains, from a monitor signal transmitted from monitoring apparatus 20, information about the precarious object situated in the blind spot and information of the position of, for example, the building and the surface of the mountain along the travel lane.

Determiner 12 determines whether the precarious object is present in a blind spot based on a positional relationship between a building or the like forming the blind spot ahead of the vehicle and the precarious object ahead of the vehicle that are indicated by the monitor signal. When dealing with the precarious object situated in the blind spot, determiner 12 causes headlamp 40 and HUD 30 to perform processing different from the processing for dealing with a precarious object situated in an area viewable by a driver.

At this time, light emission controller 13 does not cause headlamp 40 to perform an operation of emitting light toward the precarious object situated in the blind spot; in other words, light emission controller 13 controls headlamp 40 to avoid emission of light toward the precarious object situated in the blind spot. By contrast, display controller 14 causes HUD 30 to display an alert image indicating the position of the precarious object situated in the blind spot.

Control apparatus 10 according to this embodiment performs such processing because, although the precarious object situated in the blind spot needs special attention from the driver, it is pointless to emit light from headlamp 40 to the precarious object situated in the blind spot since the light would be blocked by the building or the like.

Figure 6:
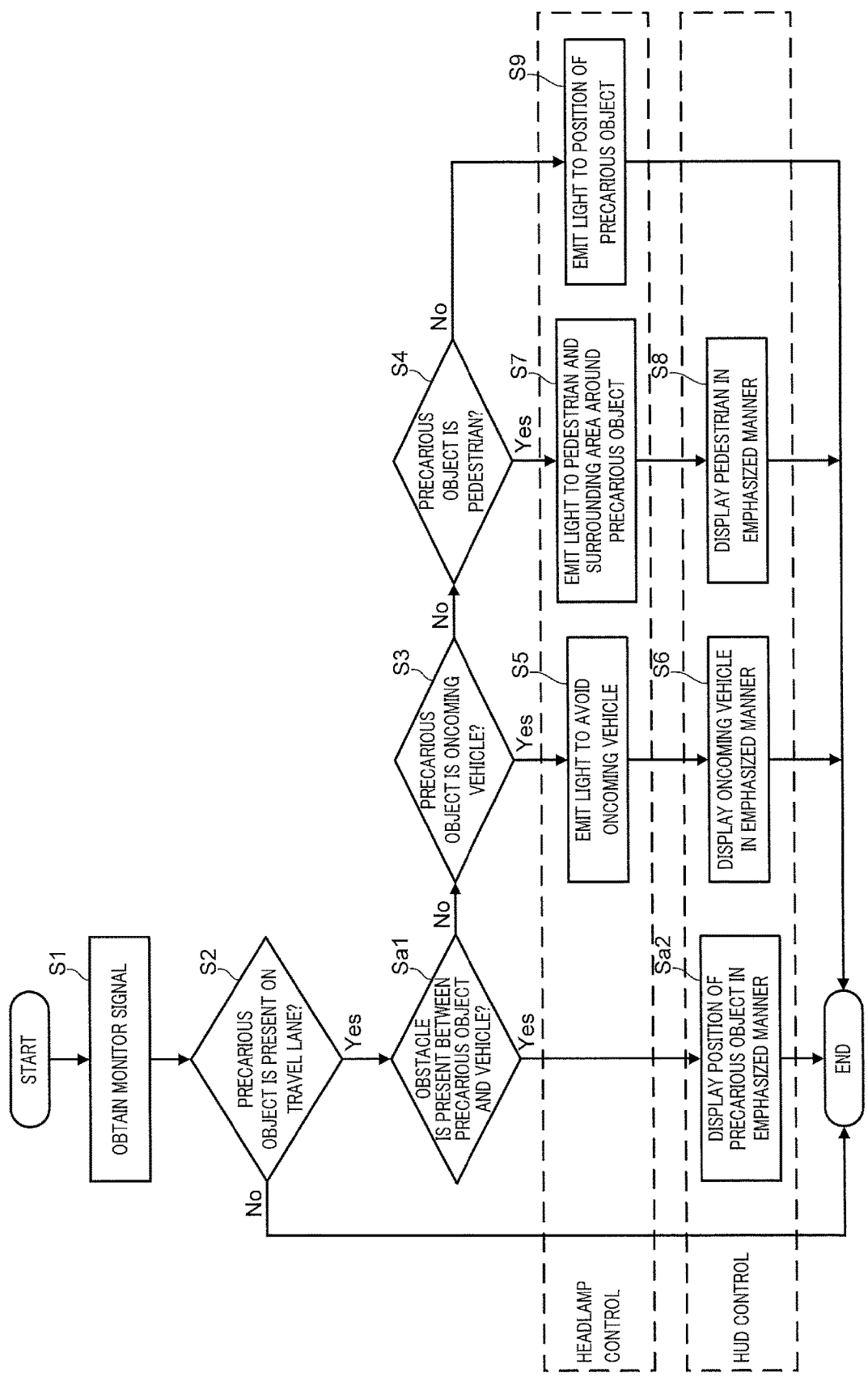
FIG. 6 is a flowchart illustrating an operation of a control apparatus according to Embodiment 2.

FIG. 6 is a flowchart illustrating an operational flow of control apparatus 10 according to this embodiment.

The flowchart in FIG. 6 differs from the flowchart in FIG. 4 in that processing operations in steps Sa1 and Sa2 are added after the processing operation in step S2 in the flowchart in FIG. 4.

Specifically, control apparatus 10 obtains a monitor signal (step S1), and when a precarious object is present on a travel lane (Yes in step S2), control apparatus 10 determines whether an obstacle (for example, a building) is present between the precarious object and a vehicle (step Sa1). When any obstacle (for example, a building) is not present between the precarious object and the vehicle (No in step Sa1), control apparatus 10 performs processing operations in steps S3 to step S9 similarly to the flowchart in FIG. 4.

By contrast, when an obstacle (for example, a building) is present between the precarious object (for example, a pedestrian) and the vehicle (Yes in step Sa1), control apparatus 10 controls HUD 30 to display an alert image indicating a position at which the precarious object is present (step Sa2). At this time, control apparatus 10 does not control headlamp 40 because emitting light from headlamp 40 to the precarious object situated in the blind spot would not warn a driver about the precarious object.

As described above, control apparatus 10 according to this embodiment also enables warning a driver about a precarious object situated in a blind spot.

Embodiment 3

Next, a configuration of control apparatus 10 according to Embodiment 3 is described with reference to FIGS. 7 to 11. Control apparatus 10 according to this embodiment differs from that of Embodiment 1 in that, when headlamp 40 is caused to emit light to a precarious object, the timing of finishing emitting light is controlled based on the position of the precarious object or the travel speed of the vehicle.

Figure 7:
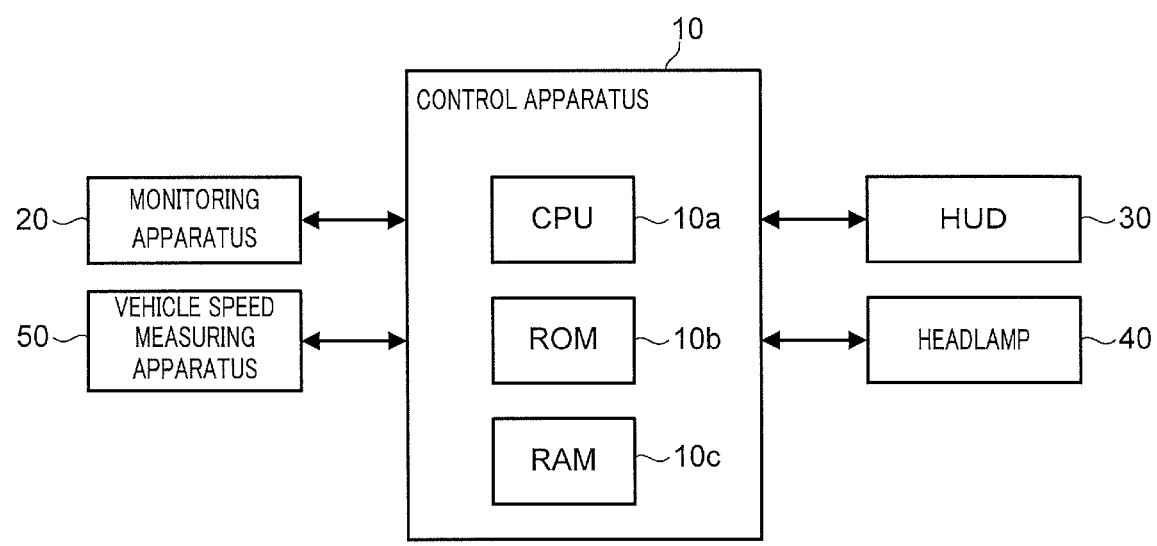
FIG. 7 illustrates a configuration of a control system according to Embodiment 3.
Figure 8:
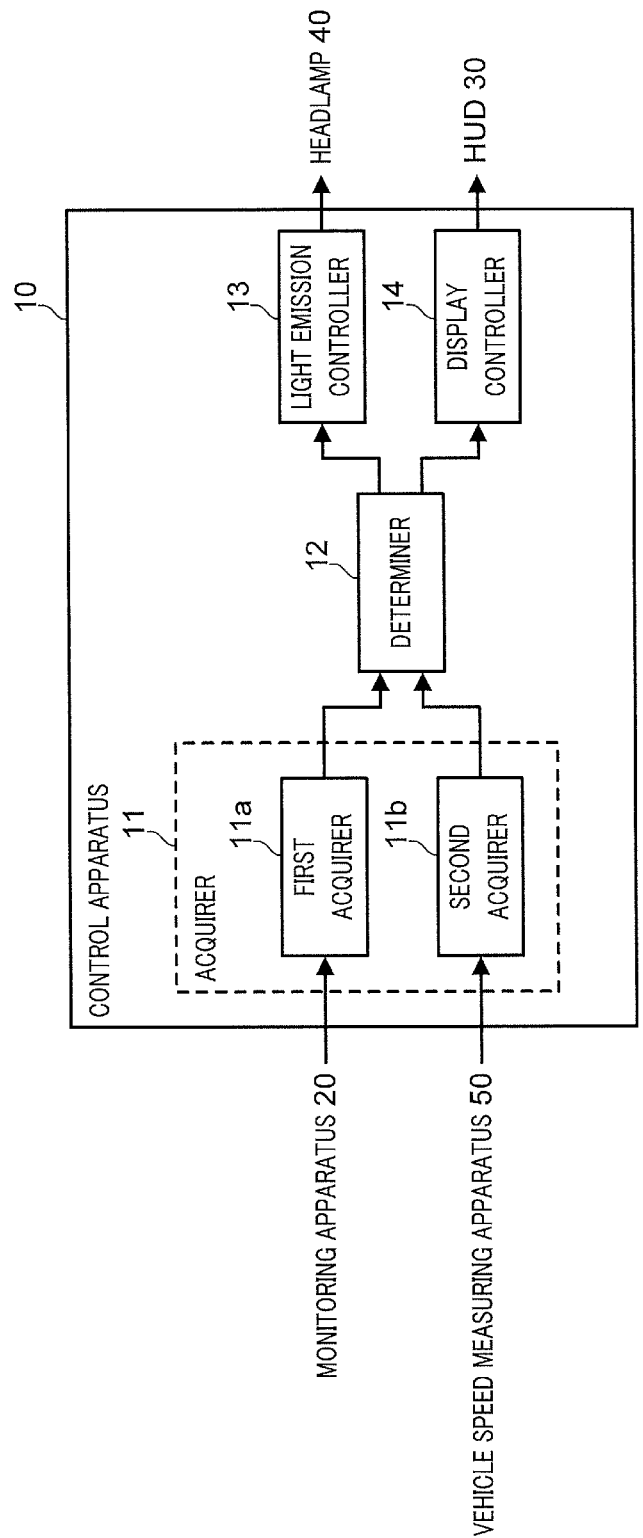
FIG. 8 is a block diagram illustrating a configuration of a control apparatus according to Embodiment 3.

FIG. 7 illustrates a configuration of control system 1 according to this embodiment. FIG. 8 is a block diagram illustrating a configuration of control apparatus 10 according to this embodiment.

Control system 1 according to this embodiment also includes vehicle speed measuring apparatus 50 that measures the travel speed of the vehicle.

Control apparatus 10 according to this embodiment includes as acquirer 11 first acquirer 11a that obtains a monitor signal from monitoring apparatus 20 and second acquirer 11b that obtains information of travel speed of the vehicle from vehicle speed measuring apparatus 50.

Determiner 12 according to this embodiment determines whether to emit light toward a precarious object by using headlamp 40 with reference to information about an illumination area within which light of headlamp 40 can reach and information about the travel speed of the vehicle in addition to a monitor signal. When the position of a precarious object is outside the illumination area of headlamp 40, and also when the travel speed of the vehicle is less than a threshold, determiner 12 determines that the precarious object about which a monitor signal contains information is not a target for control performed by light emission controller 13; in other words, while headlamp 40 is caused to emit light toward a precarious object, when the position of the precarious object moves outside the illumination area of headlamp 40, and also when the travel speed of the host vehicle falls below the threshold, determiner 12 determines to finish emitting light toward the precarious object.

The information about the illumination area of headlamp 40 referred to by determiner 12 is about the illumination area covered by all kinds of light emission forms including, for example, a form in which light is emitted in the straight-ahead direction and a form in which the direction of emitted light is changed from the straight-ahead direction to the left forward direction or the right forward direction. The information about the illumination area of headlamp 40 is stored in advance as, for example, position information based on the vehicle in ROM 10b or the like.

While in this embodiment the same conditions determine a start timing and an end timing at which headlamp 40 is caused to start or finish emitting light toward a precarious object, the start timing may be determined by using more relaxed conditions (for example, emitting light to a precarious object can be started when the precarious object is present outside the illumination area of headlamp 40).

Figure 9:
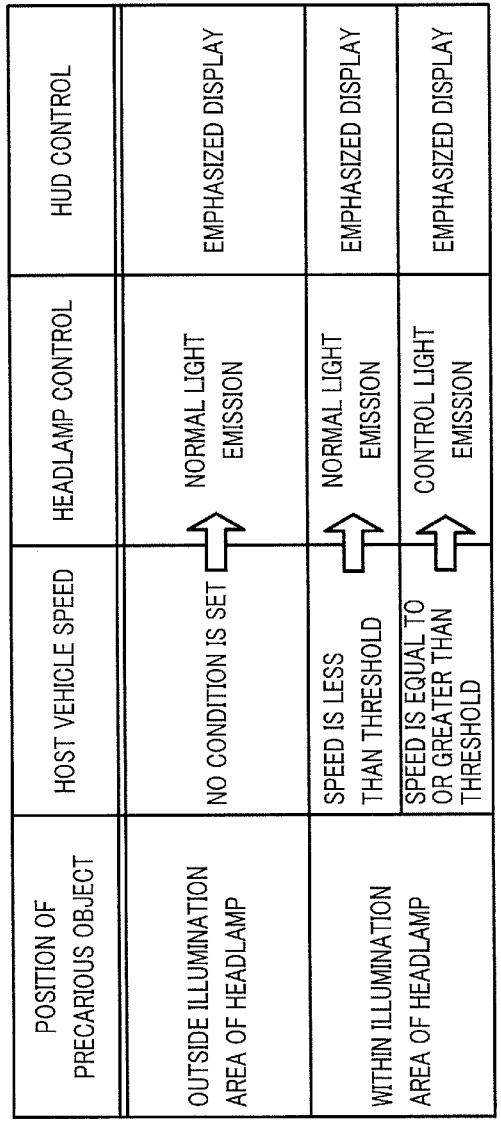
FIG. 9 is a control table illustrating details of control performed by the control apparatus according to Embodiment 3.
Figure 10A:
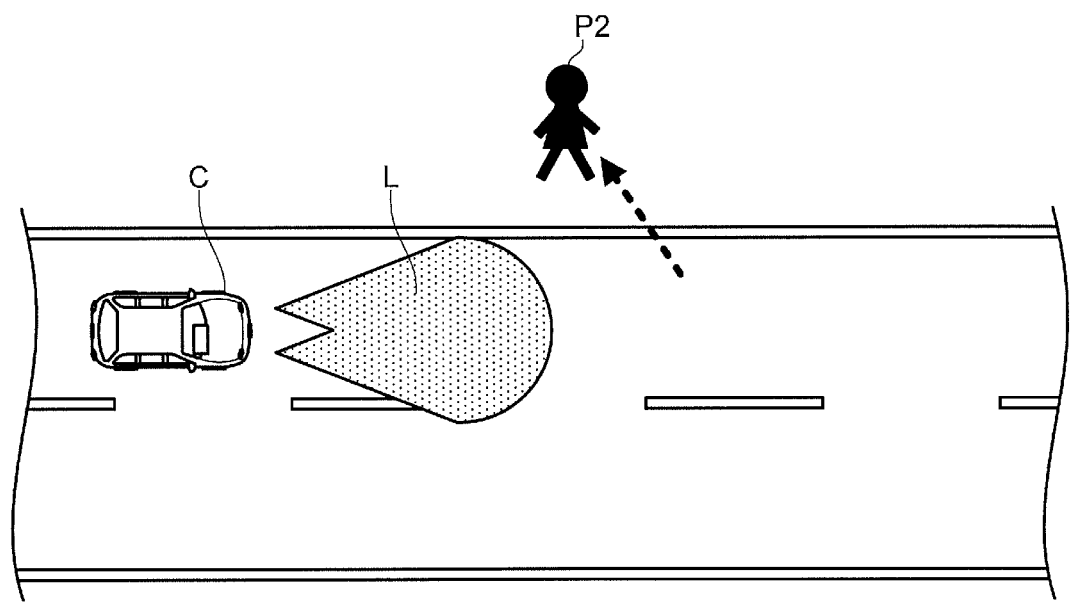
FIG. 10A illustrates an example of a light emission form of a headlamp in the control system according to Embodiment 3.
Figure 10B:
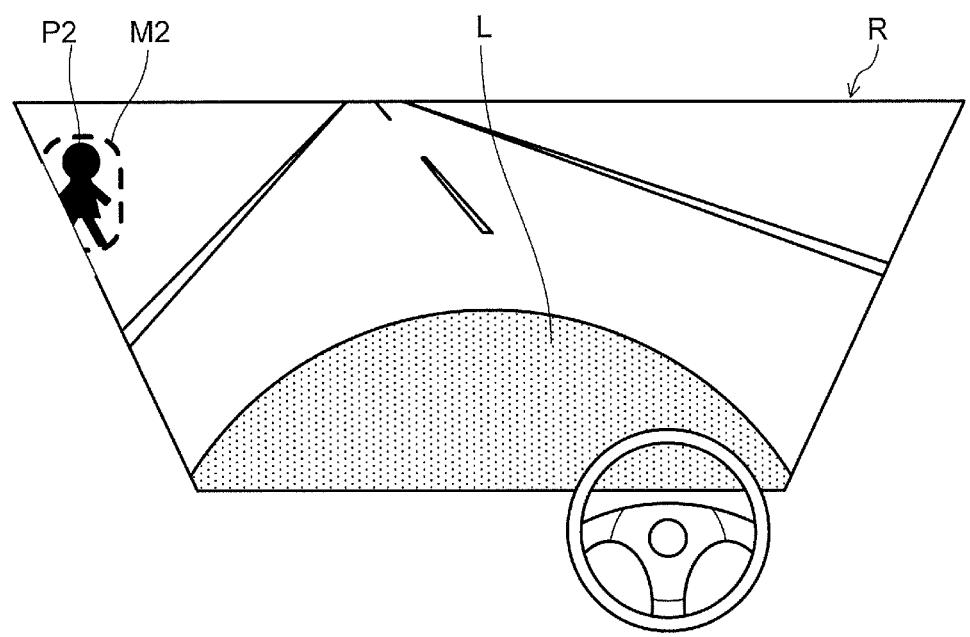
FIG. 10B illustrates an example of a display form of an alert image on a HUD in the control system according to Embodiment 3.

FIG. 9 is a control table illustrating details of control performed by control apparatus 10. FIG. 10A illustrates an example of the light emission form of headlamp 40 in the case in which precarious object P2 (a pedestrian in this example) moves away from vehicle C. FIG. 10B illustrates an example of the display form of HUD 30 in the case in which precarious object P2 (a pedestrian in this example) moves away from vehicle C.

Control forms according to this embodiment are typically applied to the case in which a precarious object is a pedestrian.

When the position of a precarious object is outside the illumination area of headlamp 40, control apparatus 10 according to this embodiment changes a state in which light is emitted toward the precarious object (for example, a state of emitting light in the left forward direction) back to a state of normal light emission (the state of normal light emission denotes a state in which light is emitted straight ahead; the same shall apply hereinafter). Such control is applied, for example, when a precarious object moves away from a vehicle or when a vehicle changes a driving lane to another lane.

When the position of a precarious object is within the illumination area of headlamp 40 and the travel speed of the vehicle is less than the threshold, control apparatus 10 also changes the state in which light is emitted toward the precarious object back to the normal light emission. Such control is applied, for example, when the vehicle starts driving at a reduced speed or when the vehicle stops temporarily.

By contrast, the position of a precarious object is within the illumination area of headlamp 40 and the travel speed of the vehicle is equal to or higher than the threshold, control apparatus 10 maintains the state in which light is emitted toward the precarious object.

This configuration enables immediately ending the state in which light is emitted toward a precarious object from headlamp 40 when the danger of occurrence of collision between the vehicle and a precarious object is decreased, and as a result, the occurrence of insufficient driver's attention to the straight-ahead direction can be hindered.

With the aim of causing a driver to recognize the position of a precarious object situated within a given distance from the vehicle, when the position of the precarious object is outside the illumination area of headlamp 40, and also when the travel speed of the vehicle is less than the threshold, control apparatus 10 maintains display on HUD 30 in an emphasized manner (the display denotes display of an alert image indicating the position of a precarious object; the same shall apply hereinafter).

Figure 11:
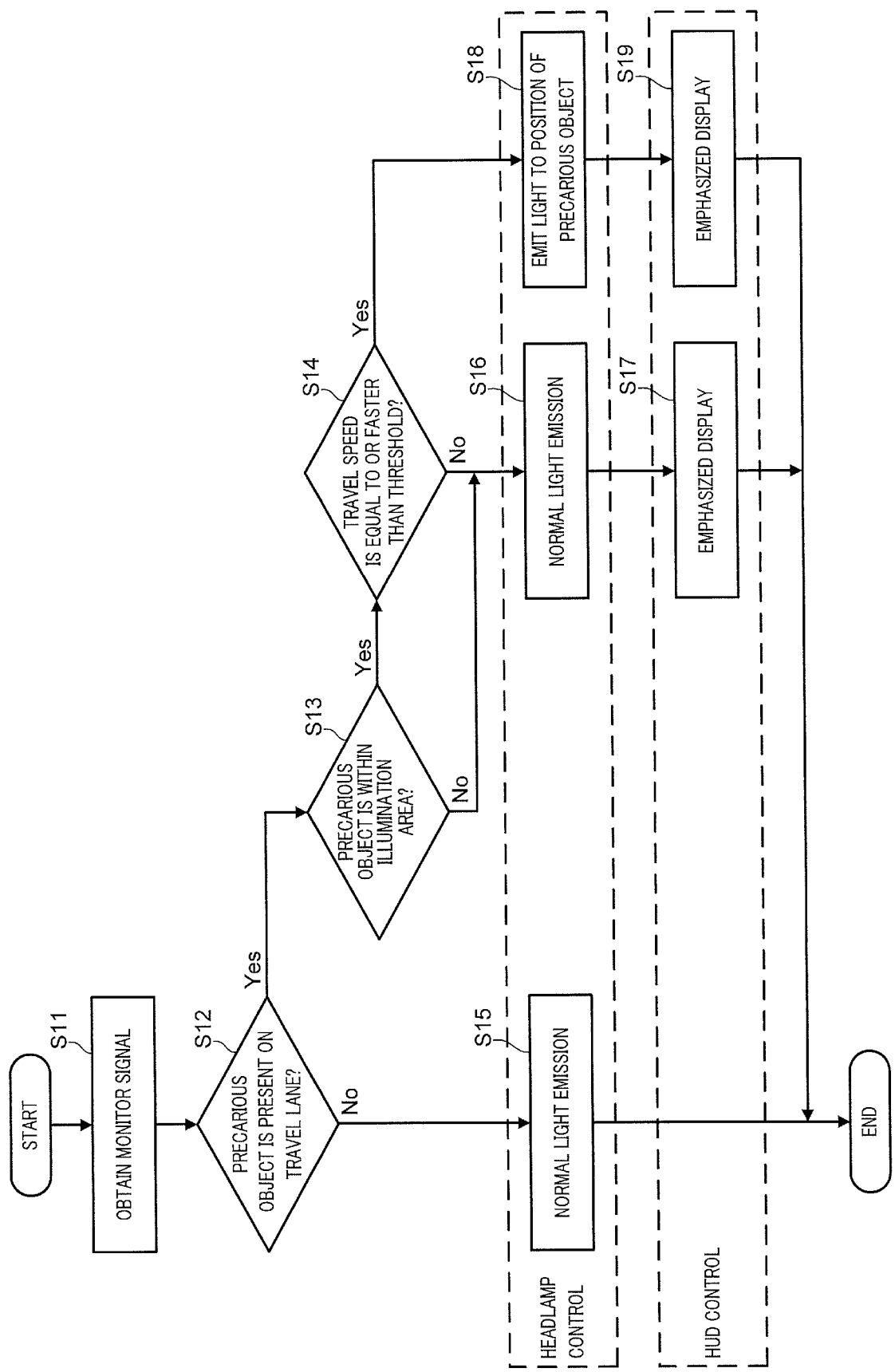
FIG. 11 is a flowchart illustrating an operation of the control apparatus according to Embodiment 3.

FIG. 11 is a flowchart illustrating an operation performed by control apparatus 10 according to this embodiment.

Firstly, control apparatus 10 obtains a monitor signal from monitoring apparatus 20 (step S11) and then determines whether a precarious object is present on a travel lane (step S12). When no precarious object is present on the travel lane (No in step S12), control apparatus 10 sets the light emission form of headlamp 40 to the normal light emission (step S15) and ends the process of the flowchart illustrated in FIG. 11. At this time, no alert image is displayed on HUD 30. By contrast, when a precarious object is present on the travel lane (Yes in step S12), the process proceeds to step S13.

Next, control apparatus 10 determines whether the position of the precarious object about which the monitor signal contains information is within the illumination area of headlamp 40 (step S13). When the position of the precarious object is within the illumination area of headlamp 40 (Yes in step S13), the process proceeds to step S14.

By contrast, the position of the precarious object about which the monitor signal contains information is outside the illumination area of headlamp 40 (No in step S13), control apparatus 10 sets the light emission form of headlamp 40 to the normal light emission state (step S16) and performs display in an emphasized manner by using HUD 30 (step S17).

In step S14, control apparatus 10 determines whether the travel speed of the vehicle is equal to or greater than the threshold. When the travel speed of the vehicle is less than the threshold (No in step S14), control apparatus 10 sets the light emission form of headlamp 40 to the normal light emission state (step S16) and performs display in an emphasized manner by using HUD 30 (step S17).

When the travel speed of the vehicle is equal to or greater than the threshold (Yes in step S14), control apparatus 10 emits light from headlamp 40 toward the position of the precarious object (step S18) and performs display in an emphasized manner by using HUD 30 (step S19).

By repeatedly performing the processing operations in steps S11 to S19 described above, while light is emitted from headlamp 40 toward a precarious object, when the danger of occurrence of collision between the vehicle and the precarious object is decreased, control apparatus 10 can immediately change the light emission form back to the normal light emission state.

As described above, control apparatus 10 according to this embodiment can more effectively cause a driver of a vehicle to realize the danger of occurrence of collision between the vehicle and a precarious object.

Embodiment 4

Next, a configuration of control apparatus 10 according to Embodiment 4 is described with reference to FIGS. 12 to 16. Control apparatus 10 according to this embodiment differs from that of Embodiment 3 in that change of the level of danger regarding the occurrence of collision between the vehicle and a precarious object is monitored, and when the level of danger is changed, the driver of the vehicle is notified of the change.

Figure 12:
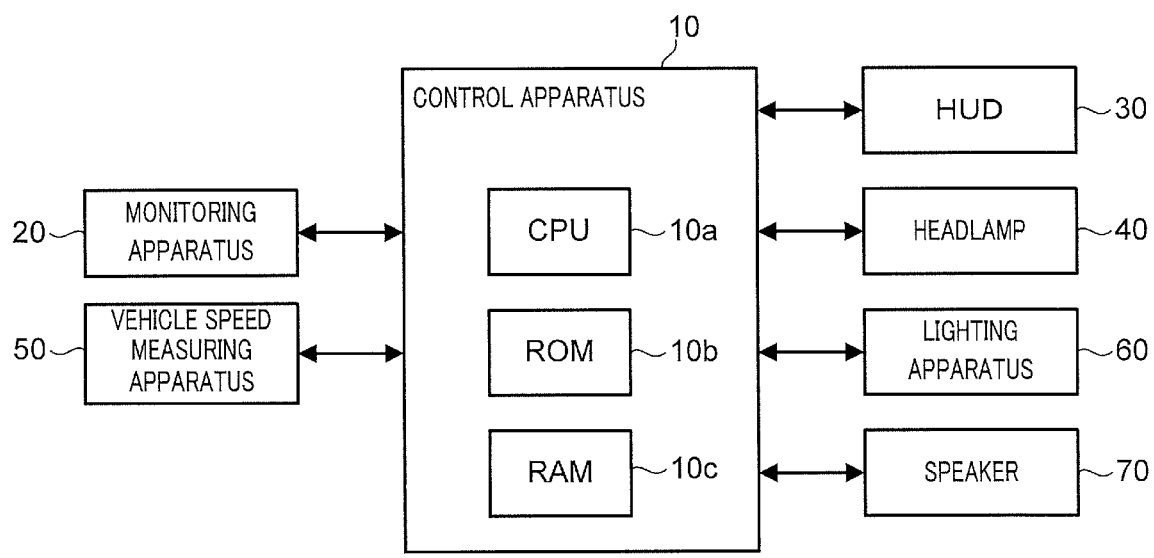
FIG. 12 illustrates a configuration of a control system according to Embodiment 4.
Figure 13:
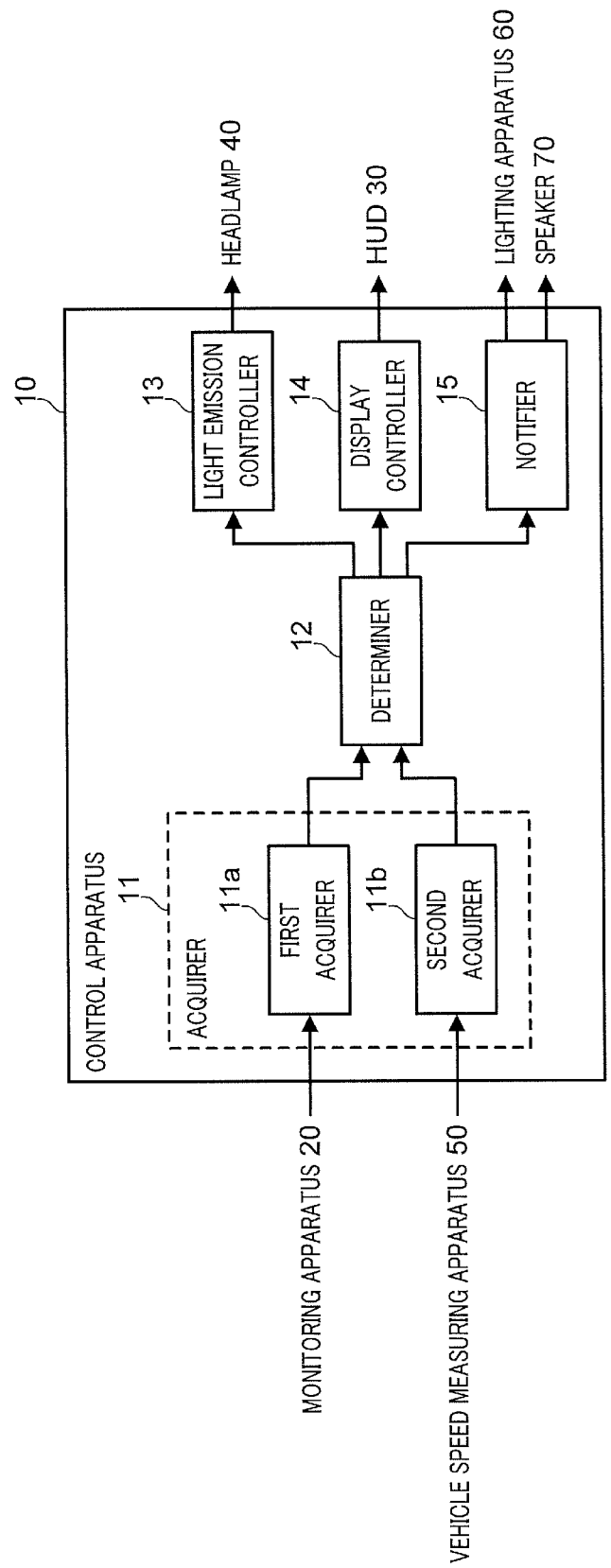
FIG. 13 is a block diagram illustrating a configuration of a control apparatus according to Embodiment 4.

FIG. 12 illustrates a configuration of control system 1 according to this embodiment. FIG. 13 is a block diagram illustrating a configuration of control apparatus 10 according to this embodiment.

The control system 1 according to this embodiment further includes lighting apparatus 60 and speaker 70. Additionally, control apparatus 10 according to this embodiment further includes notifier 15 that controls lighting apparatus 60 and speaker 70.

Lighting apparatus 60 is installed in, for example, an instrument panel and configured to warn the driver of the vehicle by using colors, lighting forms (continuous lighting or blinking), or the like about the risk of occurrence of collision between the vehicle and a precarious object. Lighting apparatus 60 according to this embodiment is controlled to apply a green lighting form (hereinafter referred to as the "normal lighting form") when there is no risk of occurrence of collision between the vehicle and a precarious object or a red lighting form (hereinafter referred to as the "warning lighting") when the danger of occurrence of collision between the vehicle and a precarious object is increased.

Speaker 70 is installed in, for example, an instrument panel and configured to warn a driver of a vehicle by using an alarm sound or the like about the risk of occurrence of collision between the vehicle and a precarious object. Speaker 70 according to this embodiment is controlled to be silent when there is no risk of occurrence of collision between the vehicle and a precarious object or to sound an alarm sound when the danger of occurrence of collision between the vehicle and a precarious object is increased.

As a mechanism used for reporting to a driver of a vehicle the presence of risk regarding the occurrence of collision between the vehicle and a precarious object, other mechanisms such as a screen display of an automotive navigation system may be used instead of lighting apparatus 60 and speaker 70.

In control apparatus 10 according to this embodiment, determiner 12 estimates the level of danger regarding the occurrence of collision between the vehicle and a precarious object based on the position of the precarious object or the travel speed of the vehicle and transmits a command signal to notifier 15 based on the level of danger. At this time, determiner 12 determines command contents for notifier 15 depending on change of the level of danger. Notifier 15 controls the lighting state of lighting apparatus 60 and the sound output of speaker 70 in accordance with the command contents of determiner 12.

The level of danger that is determined by determiner 12 is classified into, for example, three kinds of levels (for example, three kinds of levels of "danger level 0: safe", "danger level 1: moderately dangerous", and "danger level 2: extremely dangerous"). For example, the level of danger is set at the danger level 0 when a precarious object (for example, a pedestrian) is situated away from the vehicle by a given distance or longer, the level of danger is set at the danger level 1 when a precarious object (for example, a pedestrian) is situated outside a roadway; and the level of danger is set at the danger level 2 when a precarious object (for example, a pedestrian) enters into a roadway.

FIG. 14 is a control table illustrating details of control performed by control apparatus 10.

Figure 15A:
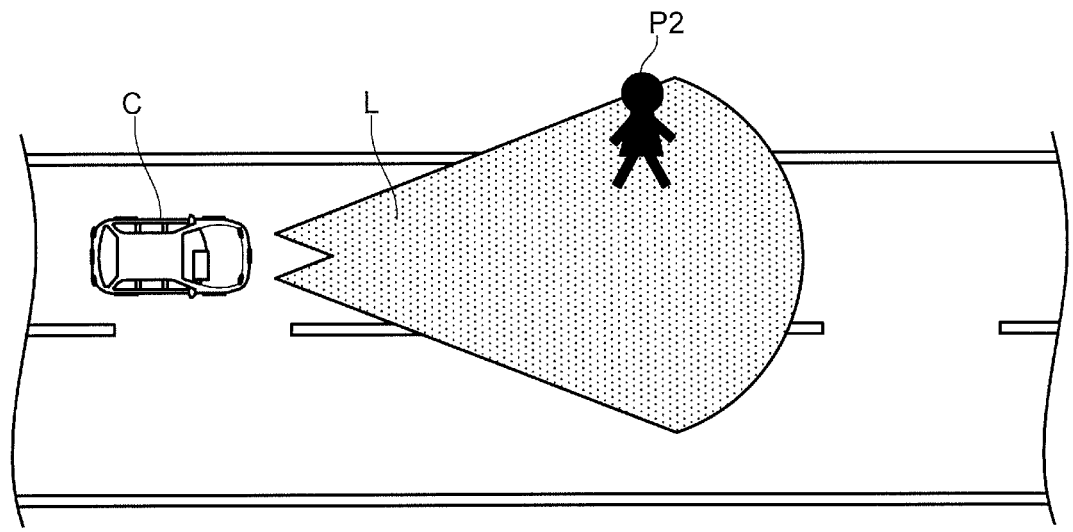
FIG. 15A illustrates an example of a control form of a headlamp, a HUD, a lighting apparatus, and a speaker in the control system according to Embodiment 4 when a precarious object moves in a direction toward a vehicle.
Figure 15B:
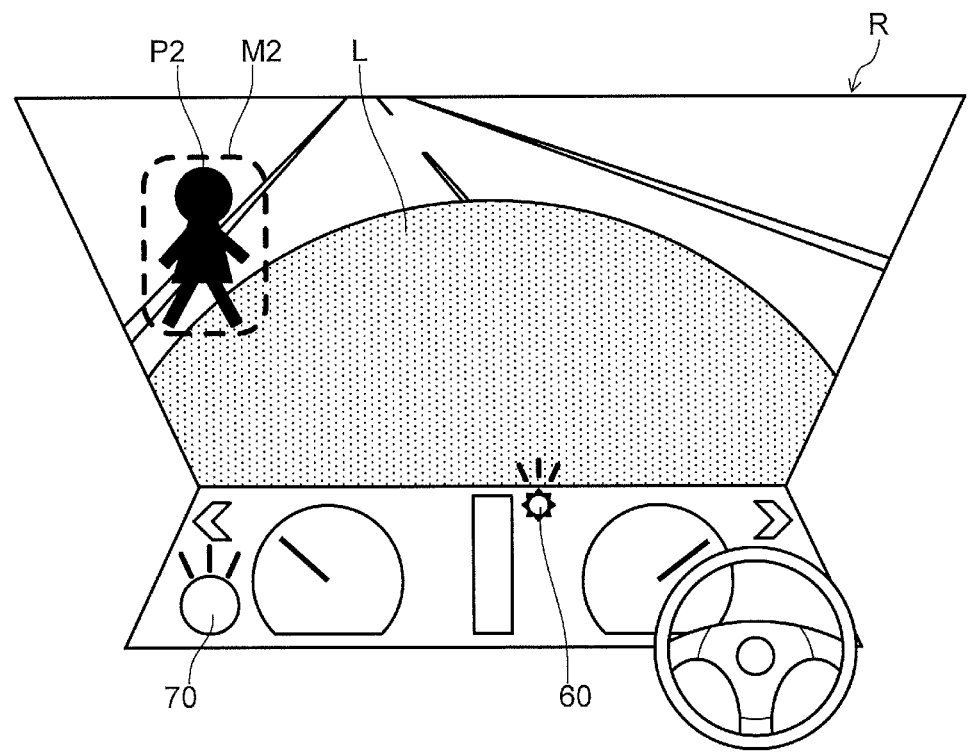
FIG. 15B illustrates an example of the control form of the headlamp, the HUD, the lighting apparatus, and the speaker in the control system according to Embodiment 4 when the precarious object moves in the direction toward the vehicle.

FIGS. 15A and 15B illustrate examples of a control form of headlamp 40, HUD 30, lighting apparatus 60, and speaker 70 when precarious object P2 (a pedestrian in this example) moves in a direction toward vehicle C. This example illustrates the state in which lighting apparatus 60 performs warning lighting and speaker 70 sounds an alarm sound because precarious object P2 (a pedestrian in this example) approaches vehicle C and the level of danger is accordingly increased.

For example, when a precarious object is detected and the level of danger is changed from the danger level 0 to the danger level 1, control apparatus 10 causes lighting apparatus 60 to perform warning lighting (for example, change from green lighting to red lighting) and causes speaker 70 to sound an alarm sound. When the level of danger is increased but the precarious object is situated at a position at which headlamp 40 does not need to illuminate the precarious object (for example, a position outside the illumination area of headlamp 40), control apparatus 10 maintains the lighting form of lighting apparatus 60 in a form indicating safety (for example, the green lighting).

When the level of danger is changed from the danger level 1 to the danger level 2, control apparatus 10 causes lighting apparatus 60 to perform warning lighting representing stronger warning (for example, changing from red continuous lighting to red blinking) and causes speaker 70 to sound an alarm sound representing stronger warning. When the level of danger remains at a level exceeding a threshold, control apparatus 10 causes lighting apparatus 60 to maintain the lighting form representing a highly dangerous state.

When the level of danger is decreased from the danger level 1 to the danger level 0, control apparatus 10 causes lighting apparatus 60 to finish warning lighting and change the lighting mode to the normal lighting form (for example, change from the red lighting to the green lighting).

While in this example the control form of control apparatus 10 with regard to headlamp 40 and HUD 30 is the same as the control form described in Embodiment 3, the control form regarding headlamp 40 and HUD 30 may be altered depending on change of the level of danger.

Figure 16:
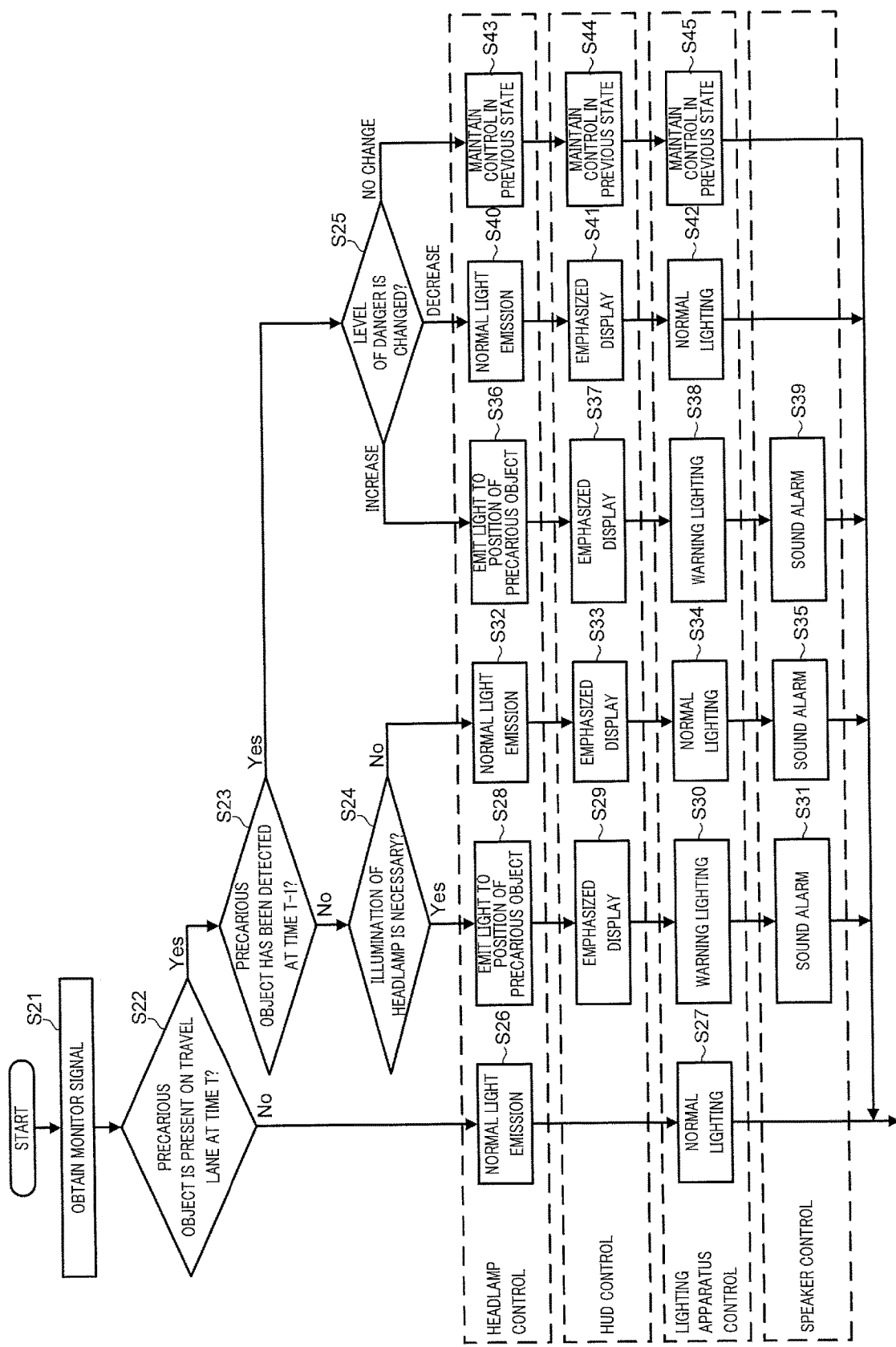
FIG. 16 is a flowchart illustrating an operation of the control apparatus according to Embodiment 4.

FIG. 16 is a flowchart illustrating an operation performed by control apparatus 10 according to this embodiment.

Firstly, control apparatus 10 obtains a monitor signal from monitoring apparatus 20 (step S21) and then determines whether a precarious object is present on a travel lane at this time (referred to as a time t) (step S22). When no precarious object is present on the travel lane (No in step S22), control apparatus 10 set the light emission form of headlamp 40 to the normal light emission (step S26), causes lighting apparatus 60 to maintain the normal lighting form (step S27), and consequently ends the process of the flowchart illustrated in FIG. 16. In contrast, when a precarious object is present on the travel lane (Yes in step S22), control apparatus 10 determines the precarious object as a target for control performed by using headlamp 40 or HUD 30 and the process proceeds to step S23.

Next, control apparatus 10 determines whether the precarious object about which the monitor signal includes information has been detected at a previous time (t−1) (step S23). When the precarious object has been detected at the previous time (t−1) (Yes in step S23), control apparatus 10 causes the process to proceed to step S25.

When the precarious object about which the monitor signal includes information has not been detected at the previous time (t−1) (No in step S23), control apparatus 10 determines whether to cause headlamp 40 to emit light toward the precarious object depending on, for example, whether the position of the precarious object is within the illumination area of headlamp 40 or whether the travel speed of the vehicle is equal to or greater than the threshold (step S24).

When it is necessary to cause headlamp 40 to emit light toward the precarious object (Yes in step S24), control apparatus 10 causes headlamp 40 to emit light toward the precarious object (step S28), causes HUD 30 to perform display in an emphasized manner (step S29), causes lighting apparatus 60 to perform warning lighting (step S30), and causes speaker 70 to sound an alarm sound (step S31).

When it is unnecessary to cause headlamp 40 to emit light toward the precarious object (No in step S24), control apparatus 10 sets the light emission form of headlamp 40 to the normal light emission (step S32), causes HUD 30 to perform display in an emphasized manner (step S33), causes lighting apparatus 60 to operate in the normal lighting form (step S34), and causes speaker 70 to sound an alarm sound (step S35).

In step S25, control apparatus 10 measures change of the level of danger regarding the precarious object. When the level of danger is increased, control apparatus 10 causes headlamp 40 to emit light toward the precarious object (step S36), causes HUD 30 to perform display in an emphasized manner (step S37), causes lighting apparatus 60 to perform warning lighting (step S38), and causes speaker 70 to sound an alarm sound (step S39).

When it is determined in step S25 that the level of danger regarding the precarious object is decreased, control apparatus 10 changes the light emission form of headlamp 40 to the normal light emission (step S40), causes HUD 30 perform display in an emphasized manner (step S41), and causes lighting apparatus 60 to operate in the normal lighting form (step S42).

When it is determined in step S25 that the level of danger regarding the precarious object is not changed, control apparatus 10 causes the light emission form of headlamp 40 to remain in the same form as the form at the previous time (t−1) (step S43), causes the display form of the HUD 30 to remain in the same form as the form at the previous time (t−1) (step S44), and causes the lighting form of lighting apparatus 60 to remain in the same form as the form at the previous time (t−1) (step S45).

By repeatedly performing the processing operations in steps S21 to S45 described above, control apparatus 10 can control lighting apparatus 60 and speaker 70 to notify the driver of the vehicle when the danger of occurrence of collision between the vehicle and the precarious object is increased; and control apparatus 10 can control lighting apparatus 60 and speaker 70 to finish the notification when the danger of occurrence of collision between the vehicle and the precarious object is decreased.

As described above, control apparatus 10 according to this embodiment can more effectively cause a driver of a vehicle to realize the danger of occurrence of collision between the vehicle and a precarious object.

The specific examples of the present invention have been described in detail above, but the description is a mere example and does not limit the appended claims. The technology described in the appended claims embraces various modifications and changes made in accordance with the specific examples described above.

This specification and the accompanying drawings disclose at least the following statements.

Disclosed is a control apparatus that controls a headlamp of a vehicle and a head-up display of the vehicle. The control apparatus includes an acquirer that obtains information about an object situated ahead of the vehicle, a light emission controller that controls a light emission form of the headlamp based on a position of the object, and a display controller that causes the head-up display to display an alert image indicating the position of the object such that the alert image is superimposed on or situated adjacent to the actual position of the object in a view that is observed in a forward direction with respect to the vehicle.

The light emission controller may control the light emission form of the headlamp based on the position of the object and the type of the object.

When the object is a pedestrian, the light emission controller may control the headlamp to emit light to the pedestrian. When the object is an oncoming vehicle, the light emission controller may control the headlamp to avoid emission of light to the oncoming vehicle.

When the object is a pedestrian, the light emission controller may control the headlamp to emit light to the pedestrian and the display controller may display on the head-up display the alert image such that the alert image is superimposed on or situated adjacent to the actual position of the pedestrian in the view.

When the object is an oncoming vehicle, the light emission controller may control the headlamp to avoid emission of light to the oncoming vehicle and the display controller may display on the head-up display the alert image such that the alert image is superimposed on or situated adjacent to the actual position of the oncoming vehicle in the view.

The display controller may cause the head-up display to display the alert image in a form in which the type of the object is recognizable.

The timing at which the display controller causes the head-up display to start displaying the alert image to correspond to the object may be earlier than the timing at which the light emission controller starts changing the light emission form of the headlamp to correspond to the object.

The control apparatus may further include a determiner that determines whether the object is situated within an acceptable area in a route on which the vehicle travels or at less than a given distance ahead of the vehicle. When the determiner determines that the object is situated within the acceptable area or the given distance, the light emission controller may control the light emission form of the headlamp to change from a first form to a second form.

When the object is in a blind spot formed by an obstacle situated ahead of the vehicle, the light emission controller may cause the headlamp to avoid emission of light toward the object and the display controller may display on the head-up display the alert image such that the alert image is superimposed on or situated adjacent to the actual position of the object in the view that is observed in the forward direction with respect to the vehicle.

The acquirer may obtain the information about the object from an on-board camera installed in the vehicle.

The acquirer may obtain the information about the object from outside of the vehicle.

The light emission controller may control, based on the position of the object or the travel speed of the vehicle, the timing at which the headlamp is caused to finishing emitting light to the object.

The light emission controller may cause the headlamp to finish emitting light to the object when the position of the object is outside the illumination area of the headlamp.

The light emission controller may cause the headlamp to finish emitting light to the object when the travel speed of the vehicle is less than a threshold.

In the control apparatus, the notification form for a driver of the vehicle may be changed depending on change of the level of danger regarding the occurrence of collision between the vehicle and the object, the level of danger being estimated based on the position of the object or the travel speed of the vehicle.

Disclosed is a control system including a headlamp of a vehicle, a head-up display of the vehicle, and a control apparatus that controls the headlamp and the head-up display. The control apparatus includes an acquirer that obtains information about an object situated ahead of the vehicle from a monitoring apparatus that monitors an area ahead of the vehicle, a light emission controller that controls a light emission form of the headlamp based on a position at which the object is present, and a display controller that causes the head-up display to display an alert image indicating the position of the object such that the alert image is superimposed on or situated adjacent to the actual present position of the object in a view that is observed in a forward direction with respect to the vehicle.

Disclosed is a control program that controls a headlamp of a vehicle and a head-up display of the vehicle. The control program causes processing to be executed, the processing including obtaining information about an object situated ahead of the vehicle, controlling the light emission form of the headlamp based on the position of the object, and causing the head-up display to display an alert image indicating the position of the object such that the alert image is superimposed on or situated adjacent to the actual position of the object in a view that is observed in a forward direction with respect to the vehicle.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2018-228256, filed on Dec. 5, 2018, and Japanese Patent Application No. 2019-012257, filed on Jan. 28, 2019, the disclosure of which including the specification, drawings and abstract is incorporated herein by reference in its entirety.

INDUSTRIAL APPLICABILITY

The control apparatus according to the present disclosure enables a driver to promptly and precisely realize a precarious object.

REFERENCE SIGNS LIST

1 Control system
10 Control apparatus
11 Acquirer
12 Determiner
13 Light emission controller
14 Display controller
15 Notifier
20 Monitoring apparatus
30 HUD
40 Headlamp
50 Vehicle speed measuring apparatus
60 Lighting apparatus
70 Speaker

The invention claimed is:

1. A control apparatus that controls a headlamp of a vehicle and a head-up display of the vehicle, comprising:
a processor that
obtains information about an object situated ahead of the vehicle;
controls a light emission form of the headlamp based on a position of the object;
causes the head-up display to display an alert image indicating the position of the object such that the alert image is superimposed on or situated adjacent to an actual position of the object in a view that is observed in a forward direction with respect to the vehicle;
determines whether the object is a target for displaying the alert image; and
when the object is determined to be the target for displaying the alert image, the processor causes the head-up display to display the alert image indicating the position of the object such that the alert image is superimposed on or situated adjacent to the actual position of the object in the view that is observed in the forward direction with respect to the vehicle.

2. The control apparatus according to claim 1, wherein the processor controls the light emission form of the headlamp based on the position of the object and a type of the object.

3. The control apparatus according to claim 2, wherein
when the object is a pedestrian, the processor controls the headlamp to emit light to the pedestrian; and
when the object is an oncoming vehicle, the processor controls the headlamp to avoid emission of light to the oncoming vehicle.

4. The control apparatus according to claim 3, wherein when the object is the pedestrian,
the processor controls the headlamp to emit light to the pedestrian, and
the head-up display is controlled to display the alert image such that the alert image is superimposed on or situated adjacent to an actual position of the pedestrian in the view.

5. The control apparatus according to claim 3, wherein when the object is the oncoming vehicle,
the headlamp is controlled to avoid emission of light to the oncoming vehicle, and
the head-up display is controlled to display the alert image such that the alert image is superimposed on or situated adjacent to an actual position of the oncoming vehicle in the view.

6. The control apparatus according to claim 2,
wherein the processor further determines whether the object is situated within an acceptable area on a route on which the vehicle travels or at less than a given distance ahead of the vehicle, and
when the object is determined to be situated within the acceptable area or at less than the given distance ahead of the vehicle, the processor controls the light emission form of the headlamp to change from a first form to a second form.

7. The control apparatus according to claim 1, wherein the head-up display is controlled to display the alert image in a form in which a type of the object is recognizable.

8. The control apparatus according to claim 1, wherein a timing at which the head-up display is controlled to start displaying the alert image in a manner corresponding to the object is earlier than a timing at which the processor starts changing the light emission form of the headlamp in a manner corresponding to the object.

9. The control apparatus according to claim 1, wherein when the object is in a blind spot formed by an obstacle situated ahead of the vehicle,
the processor causes the headlamp to avoid emission of light toward the object, and
the head-up display is controlled to display the alert image such that the alert image is superimposed on or situated adjacent to the actual position of the object in the view that is observed in the forward direction with respect to the vehicle.

10. The control apparatus according to claim 1, wherein the processor obtains the information about the object from an on-board camera installed in the vehicle.

11. The control apparatus according to claim 1, wherein the processor obtains the information about the object from outside of the vehicle.

12. The control apparatus according to claim 1, wherein the processor controls, based on the position of the object or a travel speed of the vehicle, a timing at which the headlamp is caused to finish emitting light to the object.

13. The control apparatus according to claim 12, wherein the processor causes the headlamp to finish emitting light to the object, when the position of the object is outside an illumination area of the headlamp.

14. The control apparatus according to claim 12, wherein the processor causes the headlamp to finish emitting light to the object, when the travel speed of the vehicle is less than a threshold.

15. The control apparatus according to claim 1, wherein a notification form for a driver of the vehicle is changed depending on change of a level of danger regarding an occurrence of collision between the vehicle and the object, the level of danger being estimated based on the position of the object or a travel speed of the vehicle.

16. A control system, comprising:
a headlamp of a vehicle;
a head-up display of the vehicle; and
a control apparatus that controls the headlamp and the head-up display, wherein
the control apparatus includes
a processor that
obtains information about an object situated ahead of the vehicle from a monitoring apparatus that monitors an area ahead of the vehicle,
controls a light emission form of the headlamp based on a position at which the object is present,
causes the head-up display to display an alert image indicating the position of the object such that the alert image is superimposed on or situated adjacent to an actual present position of the object in a view that is observed in a forward direction with respect to the vehicle,
determines whether the object is a target for displaying the alert image, and
when the object is determined to be the target for displaying the alert image, causes the head-up display to display the alert image indicating the position of the object such that the alert image is superimposed on or situated adjacent to the actual position of the object in the view that is observed in the forward direction with respect to the vehicle.

17. A non-transitory recording medium storing a control program that when executed by a processor, controls a headlamp of a vehicle and a head-up display of the vehicle to perform a plurality of operations, the plurality of operations comprising:
obtaining, by the processor, information about an object situated ahead of the vehicle;
controlling, by the processor, a light emission form of the headlamp based on a position of the object;
causing, by the processor, the head-up display to display an alert image indicating the position of the object such that the alert image is superimposed on or situated adjacent to an actual position of the object in a view that is observed in a forward direction with respect to the vehicle;
determining, by the processor, whether the object is a target for displaying the alert image; and
when the object is determined to be the target for displaying the alert image, causing, by the processor, the head-up display to display the alert image indicating the position of the object such that the alert image is superimposed on or situated adjacent to the actual position of the object in the view that is observed in the forward direction with respect to the vehicle.

* * * * *